Nov. 3, 1936.  C. A. SCHELLENS  2,059,613
GEAR CUTTING MACHINE
Filed May 2, 1933    2 Sheets-Sheet 1

INVENTOR
Christopher A. Schellens

Nov. 3, 1936.  C. A. SCHELLENS  2,059,613
GEAR CUTTING MACHINE
Filed May 2, 1933  2 Sheets-Sheet 2

INVENTOR
Christopher A. Schellens

Patented Nov. 3, 1936

2,059,613

UNITED STATES PATENT OFFICE 2,059,613

GEAR CUTTING MACHINE

Christopher A. Schellens, Marblehead, Mass.

Application May 2, 1933, Serial No. 668,902

13 Claims. (Cl. 90—4)

My invention relates to gear cutting machines constructed to cut gears which have teeth whose developed pitch lines are in the form of curves, and in particular gears of parabolic pitch line as described in my pending patent application, Serial No. 622,084.

It is one of the objects of my invention to produce a machine of simple structure which will cut gears of the aforesaid type accurately and rapidly without the requirement of an undue amount of skill.

It is a further object of my invention to provide a machine suitable for cutting gears having a large ratio of face width to tooth pitch, and having a relatively large helix angle at the end of the face.

How the foregoing, together with other objects and advantages as may hereinafter appear, or are incident to my invention, are realized is illustrated in the accompanying drawings in which.

Figs. 3, 4, 5, and 6 represent in plan view other geometrical relations incident to my invention as will appear hereinafter.

Figure 7:
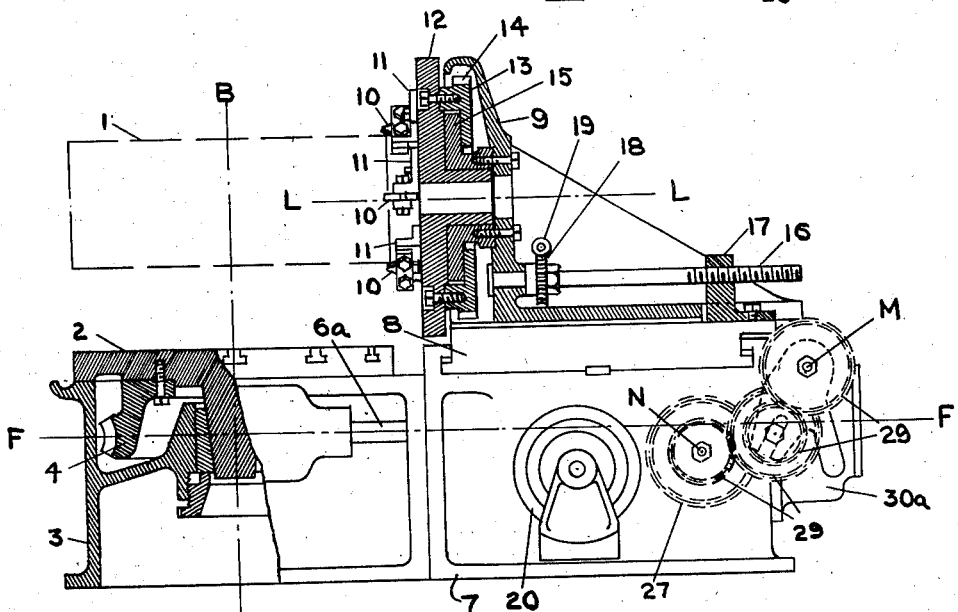

Fig. 7 represents an elevation, partly in section, of a gear cutting machine in accordance with my invention.

Figure 8:
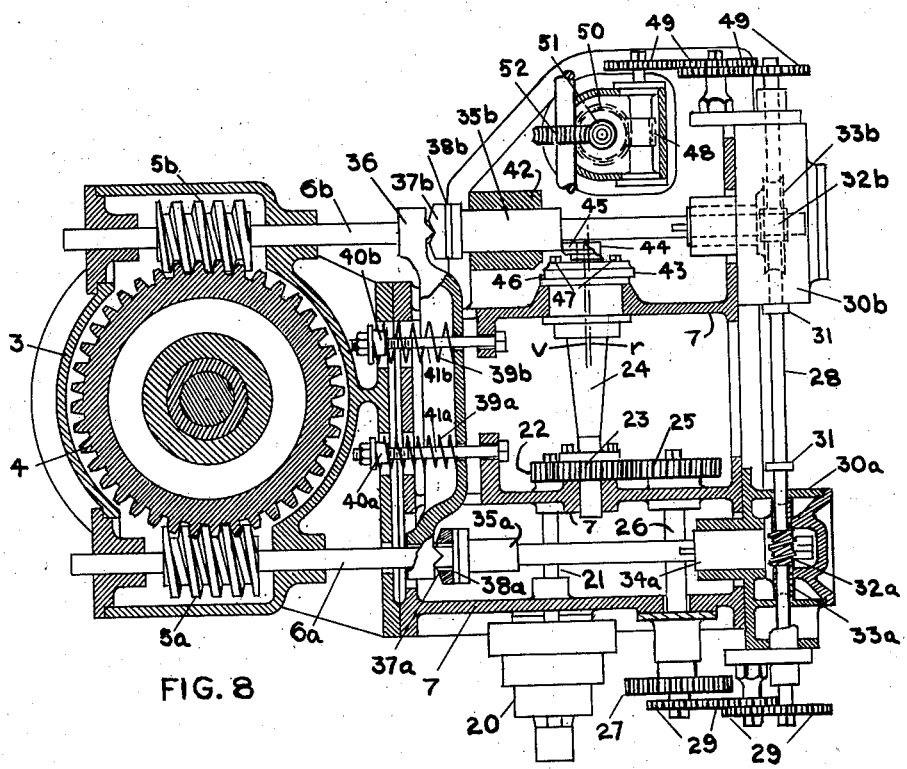

Fig. 8 represents a plan view, partly in section taken on the line FF of Fig. 7.

In the construction of my machine I utilize the principle of generating the tooth flank by an imaginary rack or crown gear, having for its flank the surface swept by the cutting edge of the tool. The said tool is advanced or fed relative to the work in such a manner that the pitch surface of the generating rack or crown gear rolls, substantially without sliding, on the pitch surface of the gear which is being cut.

Figure 1:
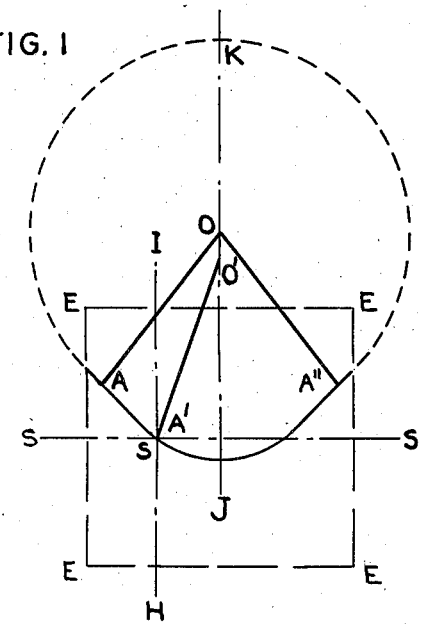
Fig. 1 represents a plan view of certain geometrical motions and relations.
Figure 2:
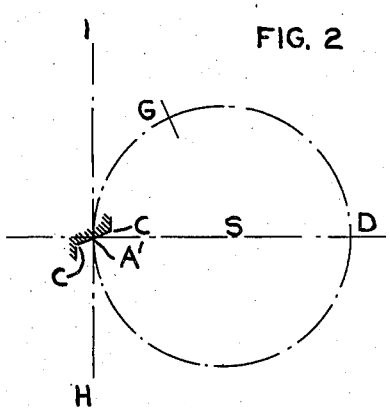
Fig. 2 represents the aforesaid motions and relations in elevation, taken on a section through line HI of Fig. 1.

The principle which I employ in securing the desired curvature of pitch line of the said generating rack, and the geometric motions involved in generating a gear having a pitch surface of the form of a circular cylinder, which form is selected for simplicity of description, is illustrated in Figs. 1 and 2. In Fig. 1, line OA swings in the plane of the paper about the movable center O, point A describing the curve AA'A''. A second position of OA is shown at O'A' and a third at OA''. If the cutting tool is so disposed with reference to the line OA that point A coincides with that point of its cutting edge which is adapted to cut the pitch line of a tooth flank, curve AA'A'' is seen to be the desired pitch line of the imaginary generating rack. The form of the curve AA'A'' depends upon the motion of the point O; and it is apparent that any desired form of the said curve can be obtained if the motion of point O is suitably controlled, by means employing cam motion, or by other suitable means as will be described hereinafter.

The pitch surface of the gear to be generated is shown in Fig. 1 by the broken line EEEE and the axis of the said gear by the line SSS. Line JK, which will be referred to subsequently, is drawn perpendicular to line SSS. In Fig. 2, which represents a section of the diagram shown in Fig. 1 by a plane perpendicular to the axis SSS and through point A', which plane intersects the plane of the paper on the line HI, the section of the gear pitch surface appears as the circle A'GD, and the line CA'C represents the section of the imaginary generating rack flank referred to above.

The generating process will now be understood. If we consider point A, the above described point of the cutting tool edge, to make successive traverses of the path AA'A'' in the above described manner, in the direction in which the said edge is adapted to cut, here assumed from A to A', and if, superimposed on the above described motion, line OA is given a uniform motion in the direction KJ while the pitch circle A'GD is given a uniform motion about S of the same amount and in the direction GA', line CA'C will generate the section of the flank of a tooth on the gear which is adapted to mesh with the corresponding flank of the generating rack.

In making the successive cuts from A to A'' I prefer to return point A to its original position through point K as shown by the dotted line in Fig. 1, whereby the line OA rotates uniformly, and without reciprocating motion, and in the construction of my machine to be described hereinafter I employ this method. It is apparent that the form of the return path A''KA is of no importance in the generating process, as the cutting edge of the tool does not come in contact with the work on this portion of its path.

It is apparent that if in place of the motion of the center O to point O' we substitute a rotation of the gear about S, whereby a point G of the pitch circle moves in the direction GD through an arc equal to OO', the tool will generate a flank of the same form as described above in respect to both longitudinal curvature and profile. In the construction of my invention in the preferred form as described hereinafter I employ the last method.

It is also evident that a modification of the circular path, which point A would have if point O were fixed, can be effected by a motion of point O in the direction perpendicular to the line JK in place of a motion along the said line as has been described, or by a combination of the said two motions, and I desire that the scope of my invention be construed to include readily apparent modifications of structure whereby the above described motions are employed.

The above described process has reference to the generation of a single flank of the gear, and the preferred superimposed geometric motions, to sum up, consist of:

(1) The continuous and uniform rotation about point O of line OA, the cutting tool being so disposed with reference to OA that the pitch point of its cutting edge passes through point A.

(2) A relatively small oscillatory angular motion of the gear about its axis SSS, controlled by cam motion or other suitable means, whereby the form of the tooth pitch line is influenced.

(3) A uniform motion of point O in the direction OJ.

(4) A corresponding uniform rotation of the gear about its axis in the direction GA'.

It will be seen that if, when the cutting edge is returned from A'' to A through K, the gear is rotated about its axis by the amount of one tooth pitch, the said cutting edge will be in a position to make a cut applying to a second tooth flank. The same process may be imagined until a cut has been made for each tooth of the gear, and the magnitude of motions (3) and (4) must be made small enough to insure that, when the second cut on the original tooth is made, the generating rack must have advanced only by a small amount; otherwise longitudinal ridges will be formed in the tooth flanks.

The intermittent rotation of the gear for the purpose of spacing the teeth, which has been described in order to clearly show the motions pertaining to my invention, has disadvantages from the standpoint of the construction of the machine, and I prefer to adopt a structure whereby the spacing rotation is continuous. I therefore prefer to provide for a uniform and continuous spacing rotation of the gear about its axis in place of the above described intermittent motion, which must be superimposed on the four motions enumerated above. The said spacing rotation is of such magnitude that for each revolution of OA the gear rotates by the amount of one tooth pitch or a multiple thereof. It is apparent that, since the said spacing rotation is a uniform one, it may be regarded as being merely additive or subtractive to motion (4), and no additional structure is required.

In the above described continuous spacing process it will be seen that, since the spacing rotation is taking place while the cut is being made, the form of the tooth pitch line curve will be altered thereby. I find that if the spacing rotation be made small the said alteration of form is small, and of no importance in the satisfactory operation of the gear. Furthermore, if the form of the tooth pitch line curve is made to depend upon cam motion as has been explained, it is apparent that the said alteration can be eliminated by an alteration of the cam. The continuous spacing rotation therefore does not alter the structure applying to motion (2).

Thus far I have described continuous generating motions applying to one flank of the tooth only. If now we imagine OA of Fig. 1 to be a line, fixed with reference to a circular plate which revolves about an axis perpendicular to the plane of the paper and passing through point O, which plate is used to carry the tool, we may mount a second tool on the said plate, with its cutting edge so disposed as to correctly cut the other flank of the tooth. Furthermore, a number of cutting tools may be mounted on the said plate, adapted to alternately cut the front and back flanks of adjacent teeth, or of teeth spaced in a definite order. In the preferred form of my invention as described hereinafter I employ this construction.

It will be seen that, in order that the various cutting tools may trace the same form of pitch line, there must be a relation between the periodicity of motion (2) described above and the number and disposition of the cutting tools. Thus, if six cutting tools are employed, spaced alternately for cutting the front and rear tooth flanks, the said tools may be so disposed that pitch line points of their cutting edges, corresponding to point A, referring to Fig. 1, lie in the plane of the paper, are equidistant from point O, and are equally spaced on a circle about point O as a center. With the said arrangement the frequency of motion (2) described above must be equal to the frequency of rotation of the said plate multiplied by six or by a multiple of six.

While a machine constructed in accordance with my invention, and operating with the above described motions may be made to cut teeth which have pitch lines of any desired form, through the operation of the above described motion (2), when this motion is obtained through the employment of cams, I prefer, particularly when the pitch surfaces of the required gears are of the forms of circular cylinders, to employ a simpler structure whereby the pitch lines are substantially of the form, or approach the form of parabolic curves. I have found that I am able to approximate the parabolic form of pitch line closely without the employment of cam motion, and by this means I secure a structure which is more readily adapted to the commercial production of gears.

Figure 3:
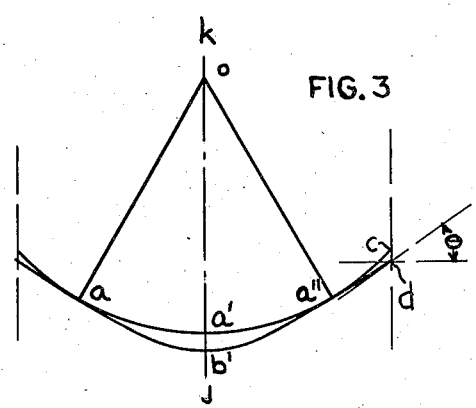

Thus, referring to Fig. 3, if $oa$ and $jk$ correspond to OA and JK of Fig. 1 respectively, $oa$ rotates about $o$ and traces the circle $aa'a''c$. Motion (2), the oscillatory rotation of the work about its axis, now consists of a motion whereby the pitch cylinder oscillates with simple harmonic motion. Such an oscillation may be produced by the structure shown in Fig. 4, which is magnified in comparison to Fig. 3, and wherein the crank TU revolves about the fixed center T with a uniform rotation, and the point U is guided to move in a straight slot in the movable member Q, which member is guided for longitudinal motion along the line TR. A point V on member Q will have the desired simple harmonic motion as is well known, which motion may be imparted to parts of my invention to produce the above described oscillation of the work about its axis. If the motion of point V in the direction TR is imagined to be transmitted to the pitch surface of the work in Fig. 3 in the direction $jk$, the point $a$ would trace the pitch line curve $ab'a''d$, by which the angle $aoa''$ corresponds to one revolution of the crank TU, and position U' of point U corresponds with positions a and a" of point a. By the proper selection of the crank length TU and the angle aoa" I find that the curve ab'a"d may be traced in various forms suitable for gear tooth pitch lines, and in particular may be made to closely approach a parabola having suitable helix angles as θ at the ends of the gear face. If arc aa' is made equal to arc a'a", as I prefer in the case of gears having cylindrical pitch lines, curve ab'a"d will be seen to be symmetrical about line jk.

Figure 5:
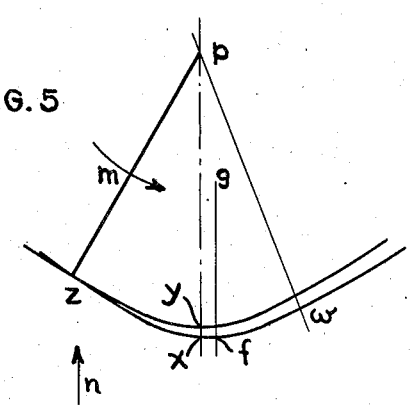

The effects of the superposition of the uniform spacing rotation described above on the form of the curve ab'a"d is shown in Fig. 5, wherein points p, z, and y correspond to points o, a, and b' of Fig. 3. If the direction of rotation of line pz is in the direction of the arrow m, and if the spacing rotation results in the work at the cutting tool moving in the direction of the arrow n, point z will trace the curve zx.

If curve zx is imagined to be translated without rotation to the proximity of curve zy, a position may be found such that the two curves approach each other closely, provided that the velocity of the pitch surface resulting from the spacing rotation as described above has been made relatively small. It will be seen that the said translation is the equivalent of shifting the gear blank along its axis relative to the position of the center o, about which the tool rotates.

While, from the standpoint of the form of the pitch surface in its relation to the operation of the gear, the lack of complete coincidence of the said curves is of no importance, it is apparent that the discrepancies must be so coordinated that proper tooth contact is obtained in the case of two mating gears. For example, it will appear that if f is the low point of curve zx, the said curve is not exactly symmetrical about the line fg, where fg is drawn parallel to py, the portion of the curve to the right of fg having a sharper curvature than the portion to the left. In order that two gears having pitch line curves of the form zx may mate properly the said pitch line curves must be so traced that the pitch line curve on one gear is of the opposite hand from that of the other.

Figure 6:
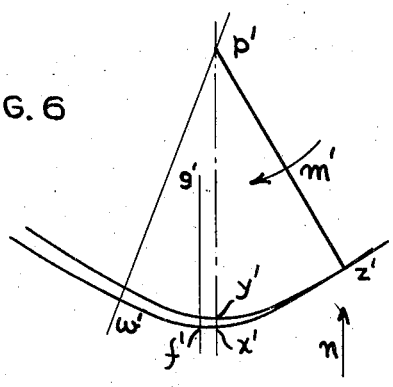
Figure 4:
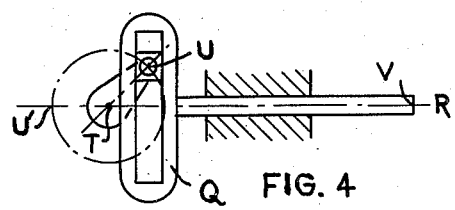

In Fig. 6, if p'z' corresponds to pz of Fig. 5, and if curve z'x' is traced in such a manner that all of the motions used in Fig. 5 are employed, with the exception that the direction of rotation of the line p'z' is reversed as shown by the arrow m' it is apparent that the curve z'x' is of the opposite hand from the curve zx, but is otherwise equal to the said curve. If now we imagine all of the motions applying to Fig. 6 as described to be reversed, the curve z'x' would again be traced, but in the reversed direction as x'z'. Furthermore, if the base curve zy is symmetrical about line py, it is apparent that the direction of rotation of the crank TU of Fig. 4 is immaterial. Therefore, in the case of the above mentioned base curve symmetry, in order to accomplish the necessary left hand tracing of the pitch line it is merely necessary to reverse the direction of the spacing rotation. In a preferred form of my invention to be described hereinafter I employ the above described method, but I may prefer to adopt other methods, apparent from the above analysis, as may apply, for example, to pitch line curves in which the base curve zy is not symmetrical, and I desire that my invention be construed to include such methods.

Referring again to Figs. 5 and 6, it will be apparent that if Fig. 6 is superimposed on Fig. 5 in such a manner that the curves coincide, which may be accomplished by rotating the plane of the paper through 180 degrees about a line in the said plane, points as w' will fall on corresponding points as w, the said points being so defined that angle x'p'w' is equal to angle xpw. If the cutting edges of the tools lie in planes perpendicular to the plane of the paper and passing through lines p'w' and pw the said planes would also coincide. Consequently, if the cutting edge of a tool suited to cut the front flank of a tooth according to Fig. 6 coincides with the cutting edge of a tool suited to cut the back flank of a tooth according to Fig. 5, when the said figures are superimposed as described above, it is apparent that the front and back flanks of the imaginary generating racks swept out by the cutting edges would coincide at all points. As is well known in the process of generating gears, such mating generating racks are suitable for generating mating tooth flanks, the form of the profile of either one of the said mating flanks being immaterial. In the construction of a machine according to my invention I utilize in substance the above described arrangements. I am aware, however, that there are other dispositions of the cutting tool edges in which it is not necessary to dispose the said edges in the planes as described above, and I desire that this feature of my invention be construed broadly.

Referring now to Figs. 7 and 8, which illustrate the structure of a form of my invention which is suitable for the cutting of a gear having a pitch surface of the form of a circular cylinder, it will be seen that the gear to be cut I, shown in broken lines, is mounted with its axis in a vertical position, and is secured to the rotating table 2, the axis of the said gear coinciding with the vertical axis of rotation BB of the said table. The said table is suitably journalled in bed 3, and is vertically supported thereby in the manner shown. Secured to table 2 is worm gear 4, which is driven by the two worms 5a and 5b in a manner to be described. The said worms 5a and 5b are secured to the two shafts 6a and 6b respectively, which shafts are so journalled as to permit of a small movement of said shafts in an axial direction.

Secured to bed 3 is a second bed 7 which carries a table 8, which table is accurately guided for transverse sliding motion in a direction perpendicular to the plane of the paper. Supported by table 8 is a frame 9, which frame carries the revolving cutting tools 10 in a manner to be described.

Frame 9 is accurately guided with reference to table 8 so that it may slide horizontally in a direction transverse to the direction of slide of table 8. Thus it will be seen that the said table 8 and the said frame 9 constitute a transverse and longitudinal feed respectively for the cutting tools 10.

The said cutting tools are held by tool holders 11, which holders are secured to revolving plate 12. Secured to the said revolving plate is the gear member 13 having gear teeth 14 cut in its periphery. A journal member 15, which is secured to frame 9, cooperates with revolving plate 12 and gear member 13 to journal the said revolving plate, whereby it rotates about an axis LL, which axis is perpendicular to axis BB and to the direction of slide of table 8, and is restrained from motion in the direction of its axis.

Frame 9 is longitudinally positioned with reference to table 8 by the threaded shaft 16 cooperating with the threaded bracket 17, which bracket is secured to table 8. The said shaft is journalled in and axially positioned by the frame 9, and is rotated by means of the worm gear 18, cooperating with the worm 19, the said worm being suitably mounted for hand operation, whereby the depth of the tooth to be cut is controlled and adjusted by hand.

In the form of my invention shown in the drawings the machine is driven by the cone pulley 20, secured to the shaft 21, which shaft is journalled in the bed 7. The said pulley drives the gear 22 which is secured to shaft 21. The gear 22 meshes with and drives gear 23, which last gear is secured to the horizontally disposed shaft 24, the said shaft being journalled in bed 7. The gear 23 meshes with and drives gear 25, which last gear is secured to the horizontally disposed shaft 26, which shaft is fixedly journalled with reference to the bed 7 and has its centerline at N, Fig. 7.

Secured to shaft 26 is the gear 27; and the rotation of gear 27 is transmitted to gear 13 through a suitable train of gears, mounted where necessary on splined shafts, whereby plate 12 is uniformly rotated in a fixed ratio to the rotation of cone pulley 20, and whereby the transverse and longitudinal motions of table 8 and frame 9 as described above are not restricted. The said train of gears and splined shafts constitute a structure which is well known in the construction of machine tools, and for reasons of clearness are omitted from the drawings.

The horizontal shaft 28, having its center line at M, Fig. 7, is driven from shaft 26 through the compound change gears 29. The said shaft 28 is journalled in the two like, but of opposite hand, gear casings 30a and 30b which are secured to the bed 7, and is restrained from motion in an axial direction by the two collars 31 which are secured to the said shaft.

The two like worms 32a and 32b are secured to shaft 28 and mesh with the two like worm gears 33a and 33b. The said worm gear 33a is provided with an elongated hub 34a which is journalled in the worm gear casing 30a, whereby the said worm gear rotates coaxially with the shaft 6a, the said shaft passing through the said worm gear hub 34a, and having a splined connection therewith. Thus it will be seen that the said hub drives, and at the same time permits of unrestricted axial motion of the said shaft. Worm 33b is mounted for driving shaft 6b in the like manner.

It will be seen that, by the means which I have described, I provide for a uniform rotation of table 2, insofar as the said rotation is due to the rotation of worms 5a and 5b. The said table rotation corresponds to the algebraic sum of the spacing rotation and the above described motion (4); and the magnitude thereof is capable of very fine adjustment by means of the change gears 29, to suit the cutting of gears of different diameters and tooth pitch. The cutting of gears suited to mate, and therefore of different hand relative to one another, is accomplished by substituting for worm and gear combinations 32a and 33a and combinations 32b and 33b, said combinations being used for gears cut to one hand, other, like but of opposite hand thereto worm and gear combinations, taken together with a small change in the change gear ratio.

Motion (2) of the table 2, which, in the form of my invention illustrated in Figs. 7 and 8, consists of simple harmonic motion, is secured by a simple harmonic motion in an axial direction of the shafts 6a and 6b, whereby the worms 5a and 5b impart a simple harmonic angular oscillation to the worm gear 4 and the table 2 by means now to be described. Secured to shafts 6a and 6b are collars 35a and 35b, which collars are subjected to a thrust in a direction to the right in Fig. 8 by the spring loaded floating yoke 36. The said yoke bears against the thrust collars 37a and 37b which exert a force against the said collars 35a and 35b respectively. The compression springs 39a and 39b bear against the yoke 36, and against the spring followers 40a and 40b respectively which followers are adjustably positioned along the bolts 41a and 41b respectively, which bolts are longitudinally fixed with reference to the frame 7 as shown in the drawings. Collar 35b rotates in journal 42 which is secured to the bed 7. The roller thrust bearing cages 38a and 38b transmit the thrust of the yoke 36 to the collars 35a and 35b respectively, and by the above described means the thrust applied to each of the said collars is independently adjustable.

The shaft 24 is enlarged at one end as shown ir Fig. 8; and to the enlarged end is adjustably secured circular plate 43. Integrally formed with the said plate is the crank pin 44 on which the wheel 45 is journalled. Plate 43 is rotatably fix' 1 with reference to the enlarged end o' shaft 24 by the key 46; and sliding adjustment of the said plate with reference to the said enlarged end is permitted by the said key, the relative position of the said plate being locked by bolts 47 or by other suitable means. It will thus be seen that plate 43 cooperating with shaft 24 forms a rotating crank, the axis of the crank pin 44, shown at $r$, being eccentric of the axis $v$ of the shaft 24, the amount of the said eccentricity being adjustable.

The collar 35b is held against the wheel 45 by pressure which is exerted by the spring 39b, which spring is adjusted to produce a relatively large thrust on the said collar, and the axial position of worm 5b is thus determined by the angular position of shaft 24; and the said worm oscillates back and forth with simple harmonic motion as the said shaft rotates with a uniform rotation.

The said rotating crank corresponds to the crank TU of Fig. 4. I have described my invention as including means whereby the shaft 24 is connected for driving plate 12 through a gear train and I select the gear ratios of the said train, as well as the angular relative position of the imaginary crank of which 44 is the crank pin to suit the number and angular position of the cutting tools, as has been explained in the consideration of the geometrical diagrams and motions described above.

I find that the magnitude and direction of the reactive moments exerted on worm wheel 4 by the action of the cutting tools may change periodically as the cutters traverse the work and I adjust the spring forces on the yoke 36 in such a manner that the thrust exerted by the said yoke on collar 35b is always in excess of that transmitted to the said collar in the opposite direction by the above described cutting reactions. Thus it will appear that, by the construction which I employ, the inaccuracies in the periodic axial motion of worm 5b due to looseness in the mounting of shaft 24 in its bearings, and in the journalling of wheel 45 on crank pin 44, are eliminated.

The object of the worm 5a is to eliminate the inaccuracies in the harmonic oscillation of the gear 4 insofar as they are due to a looseness or backlash in the mesh of the worm 5b, due to wear and other causes, and I further adjust the said spring forces in such a manner that the worm gear 4 always reacts on the worm gear 5b in a manner whereby it tends to move the said worm to the left in Fig. 8. In this way I insure that the tooth contact between worm gear 4 and worm gear 5b takes place on one side of the tooth only.

The adjustment of the said springs may be clearly described if we represent the maximum reaction produced on the worm gear 4 by the said tool cutting action, when reduced to the worm gear pitch line, in a clockwise and counter clockwise direction by X and Y respectively. The springs are so adjusted as to produce thrusts on the said collars whereby the thrust on collar 35a is in excess of X and the thrust on collar 35b is in excess of the sum of Y plus the thrust on collar 35a.

It is apparent that by careful fitting, or by the provision of a slight adjustment of the bearings of shaft 6b, or by other means, the backlash in the mesh of worm 5b may be reduced or eliminated, and I may choose to omit worm 5a and its driving means, and to substitute for the yoke 36 other readily apparent means whereby spring force is applied to collar 35b only. I wish it understood that in this respect I show my invention in the drawings in its most complete form, and may elect to adopt another structure without departing from the spirit of my invention.

It will be seen that by the structure which I have described I avoid the further source of inaccuracy which might otherwise be caused by the looseness or backlash which may exist in the meshing of gears 22 and 23. Referring to Fig. 4, it is evident that, since the reaction at point V is fixed in direction in the application of the above described crank motion to my invention, the reactive torque on the crank TU changes in direction at the dead center positions of the said crank. For this reason the torque exerted on shaft 24 of Fig. 8 by the collar 35b changes in direction, and the teeth of gear 23 tend to contact with those of gear 22 periodically on their front and back flanks. However, this tendency is overcome by the interposition of gear 23 between gears 22 and 25, since the reaction on gear 23 due to gear 25, which last gear transmits the relatively large unidirectional torque necessary to drive the cutters and other parts of the machine, is much larger than the above described oscillatory reactions; and the combined reaction from the two sources is a unidirectional reaction on the teeth of gear 22.

The motion (3) described above which consists of the transverse motion or feed of the table 8 is obtained from the rotation of worm 48, which is driven from shaft 28 through the change gears 49. Worm 48 drives worm gear 50, which is secured to the same shaft as and drives worm 51. Worm 51 in turn drives worm gear 52, the speed of rotation of the last worm gear being greatly reduced by the compound worm gear drive as described. In my invention I drive a lead screw, which accurately controls the transverse motion or feed of table 8 from the said worm gear 52 through a positive clutch, whereby the lead screw may be disengaged from gear 52 and operated by hand. I furthermore provide means whereby the backlash in the said screw is eliminated by adjustment. The said feeding means form a structure well known in the construction of machine tools and are omitted from the drawings for reasons of clearness.

I desire that the scope of my invention be construed to include variations from the structure as described above, which apply to the generation of gears having conical pitch surfaces, in which the cutting edges of the said cutting tools trace the flanks of a crown gear in place of those of a rack, as is well known in the art of cutting gears. I may also prefer in certain cases to mount the work on centers, and to make other modifications which utilize principles well known in the construction of machine tools.

I claim:

1. In a gear cutting machine a member mounted for uniform rotation about an axis and carrying a cutting tool, means for rotatably supporting and controlling the rotation of the work, journalling means for said member, means for imparting motion to said journalling means whereby the axis of said member moves with a uniform velocity in a direction transverse to itself and in a plane perpendicular to the axis of rotation of the work, and cooperating means whereby the work is actuated with a periodic angular motion superimposed on a uniform rotation, both about its axis of rotation.

2. In a gear cutting machine a member mounted for uniform rotation about an axis and carrying a plurality of cutting tools, means for rotatably supporting and controlling the rotation of the work, journalling means for said member, means for imparting motion to said journalling means whereby the axis of said member moves with a uniform velocity in a direction transverse to itself and in a plane perpendicular to the axis of rotation of the work, and cooperating means whereby the work is actuated with a periodic angular motion superimposed on a uniform rotation, both about its axis of rotation.

3. In a gear cutting machine a member mounted for uniform rotation about an axis and carrying a plurality of cutting edges, said edges being so positioned with reference to said member that specific points thereon lie in a plane perpendicular to said axis, are equidistant from said axis, and are equally spaced, means for journalling said member, means for positioning the work, means for imparting a uniform motion to said journalling means and said positioning means whereby each of said cutting edges during a portion of a revolution about said axis describes the complete surface of a gear flank of an imaginary rack, whose pitch surface rolls without sliding on the pitch surface of the work, and means for imparting to said positioning means a superimposed angular periodic motion of a frequency equal to the frequency of rotation of said member multiplied by the number of cutting edges.

4. In a gear cutting machine a member mounted for uniform rotation about an axis and carrying an even number of cutting edges adapted to alternately cut the front and rear flanks of gear teeth, the said edges being so positioned with reference to said member that specific points thereon lie in a plane perpendicular to said axis, are equidistant from said axis and are equally spaced, means for journalling said member, means for positioning the work, means for imparting a uniform motion to said journalling means and said positioning means whereby said cutting edges during a portion of a revolution about said axis describe alternately the front and rear flanks of the teeth of an imaginary rack, whose pitch surface rolls without sliding on the pitch surface of the work, and means for imparting to said positioning means a superimposed angular motion of a frequency equal to the frequency of rotation of said member multiplied by the number of cutting edges.

5. In a gear cutting machine of the kind described, means for rotating the work including a worm gear, two worms meshing therewith, mounted for rotation about their axes, and for oscillation in the direction of their axes, means for axially oscillating said worms, and means for imposing an axial force on said worms whereby said worms react on said oscillating means with a unidirectional force during the total period of operation of said machine, and whereby the effects of the looseness of the connecting parts of said oscillating means, and of the looseness in the mesh of said worms with said worm gear are eliminated.

6. In a gear cutting machine of the kind described, an oscillating member adapted to impart an oscillating angular motion to the work, a rotating member adapted to actuate said oscillating member, driving means for said rotating member, a gear mounted on and secured to said rotating member, and a second gear meshing therewith and driven thereby, said second gear being adapted to actuate power absorbing parts of said machine, whereby the unidirectional torque reaction exerted on said rotating member by said power absorbing parts is greater than the torque, reversible as to direction, which is exerted on said rotating member by the reaction of said oscillating member, and whereby the effect of looseness in the angular positioning of said rotating member is el inated.

7. In a gear cutting machine a member mounted for uniform rotation about an axis and carrying cutting edges having equal angular spacing thereabout, means for imparting a uniform rotation to the work about its axis whereby the teeth are continuously spaced, and means for superimposing on the work a periodic rotation about its axis of a frequency equal to the product of the frequency of rotation of said member times the number of cutting edges, said periodic rotation influencing the pitch line form of the tooth.

8. In a gear cutting machine a member mounted for uniform rotation about an axis and carrying cutting edges having equal angular spacing thereabout, means for imparting a uniform rotation to the work about its axis whereby the teeth are continuously spaced, and means for superimposing on the work a periodic rotation about its axis of a frequency equal to the product of the frequency of rotation of said member times a multiple of the number of cutting edges, said periodic rotation influencing the pitch line form of the tooth.

9. In a gear cutting machine a member mounted for uniform rotation about an axis and carrying a cutting tool, means for supporting the work rotatably about its axis, and means for imparting rotary motion to said supporting means about said work axis, said motion consisting of a periodic oscillation of the character of a simple harmonic function of the time superimposed on a uniform rotation, said uniform rotation of said supporting means serving to space the teeth, and said periodic oscillation cooperating with the motion of said cutting tool in determining the pitch line form of the tooth.

10. In a gear cutting machine of the kind described adapted to generate gear teeth having a nonsymmetrical pitch line, a member mounted for uniform rotation about an axis and carrying a cutting edge lying substantially in a plane through said axis, means for supporting the work for rotation about its axis, means for imparting rotary motion to said supporting means about the work axis, said rotary motion including a continuous rotation whereby the teeth are spaced superimposed on a periodic oscillation, said oscillation being symmetrical with reference to a position of said plane perpendicular to the axis of the work, whereby a mating gear may be generated by reversing the direction of said spacing rotation, all other motions of the machine remaining unchanged.

11. In a gear cutting machine adapted to continuously generate curved tooth gears wherein the circumferential component of the reaction of the cutter on the work alternates in direction, means for rotating the work including a worm gear, a worm meshing therewith mounted for rotation about its axis, means limiting axial motion of said worm in one direction, and means for subjecting said worm wheel to a positive force moment to continuously position said worm at its axially limited position and one series of tooth flanks of said worm wheel in a position of contact with the corresponding tooth flanks of said worm.

12. In a gear cutting machine adapted to continuously generate arcuate tooth gears, means for rotating the work including a worm gear, two worms meshing therewith mounted for rotation about their axes, means limiting the axial motion of one of said worms in one direction, and means for subjecting said worms to positive axial forces to continuously position said one worm at its axially limited position, one series of tooth flanks of said worm wheel in a position of contact with the corresponding tooth flanks of said one worm, and the other series of tooth flanks of said worm wheel in a position of contact with the corresponding tooth flanks of the other of said worms.

13. In a gear cutting machine a cutting tool, means for imparting motion to said tool, means for rotating the work including a worm gear, a worm meshing therewith mounted for rotation about its axis and for oscillation in the direction of its axis, and means, coordinated with the motion of said tool, for continuously oscillating said worm in an axial direction during the cutting process to influence the pitch line form of the tooth.

CHRISTOPHER A. SCHELLENS.